(No Model.)
C. H. BERNHEIM.
BRACE FOR BEDSTEADS.
No. 512,092. Patented Jan. 2, 1894.
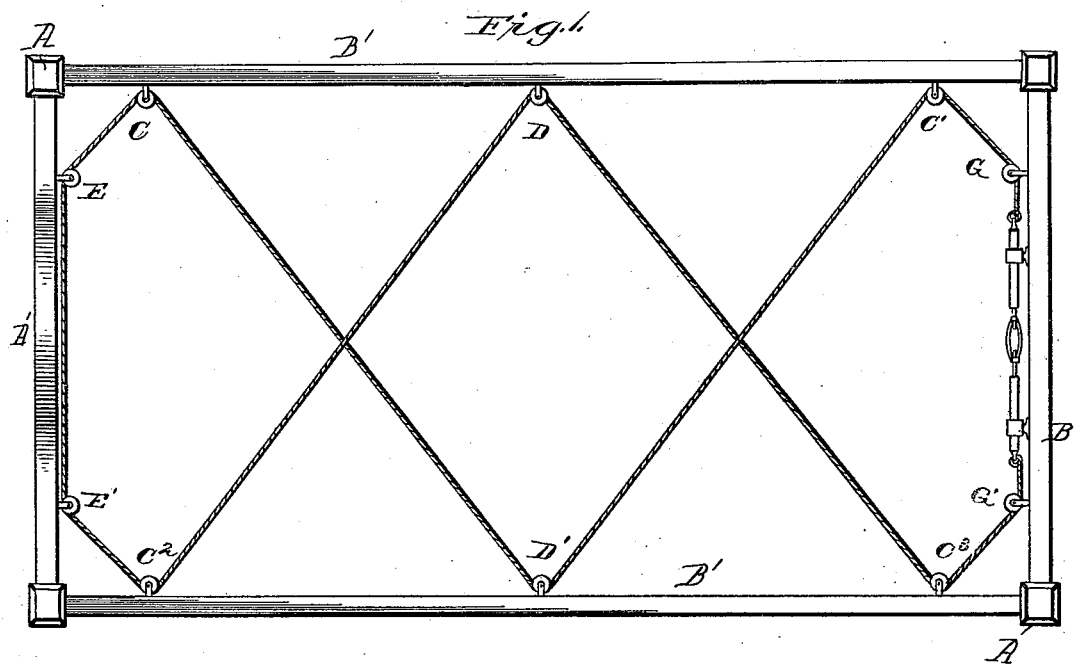
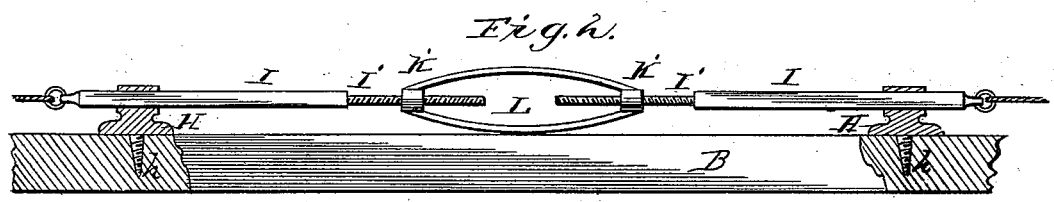

UNITED STATES PATENT OFFICE.

CHARLES H. BERNHEIM, OF CONOVER, NORTH CAROLINA.

BRACE FOR BEDSTEADS.

SPECIFICATION forming part of Letters Patent No. 512,092, dated January 2, 1894.

Application filed April 13, 1893. Serial No. 470,215. (No model.)

*To all whom it may concern:*

Be it known that I, CHARLES H. BERNHEIM, of Conover, county of Catawba, State of North Carolina, have invented new and useful Improvements in Braces for Bedsteads, of which the following is a full and exact description, reference being had to the accompanying drawings, making part of this specification.

My invention relates to that class of devices used for bracing bedsteads by means of wire cord or rope.

My invention consists in a novel manner of locating the pulley wheels or guides for the cord or rope whereby the cord or rope in passing around the same acts to brace the corners of the ends and side rails and also the central portions thereof.

It further consists in certain novel features in the construction and arrangement of parts all as hereinafter explained.

In the accompanying drawings Figure 1, is a plan view of a bedstead frame showing the manner of applying the guides or pulleys and the bracing wire or cord thereto. Fig. 2, is a section through the footboard of the bedstead showing the wire or cord tightening device. Fig. 3 is a view of one of the guide standards for the sliding rod to which one end of the rope or cord is attached to prevent the same from turning or twisting.

In the accompanying drawings A, represents the posts, A' the head and B the foot board, and B' the side rails of the bedstead.

Connected to the side rails near each end are guide loops or pulleys C, C', $C^2$, $C^3$, and also connected centrally of the length of said rails are guide loops or pulleys D, D', hereinafter referred to, and to the head and foot boards near each end are connected guide loops or pulleys E, E', and also to the head board are connected similar guide loops or pulleys G, G'.

Preferably connected to the foot board are standards H, at points on each side of the center of said board, which standards are provided with screw threaded shanks $k$, for connecting them therewith, and provided with openings in the head portion made in square form as shown at $h'$, to receive and guide rods I. These rods are provided on one end with a screw threaded portion I', one cut with a right and the other with a left hand thread, and the opposite ends of the rods are provided with an eye or hook $I^2$, to which the ends of the cord or wire rope K, are secured, the two being connected by means of a swivel or yoke L.

The swivel or yoke is provided with internally screw threaded ends $k'$, with which the screw threaded ends I', of the guide rods I, are connected.

The wire cord or rope I, has one end connected with the eye on one of the rods extending thence around the pulley G', at one side of the foot board, thence diagonally to and around the pulley C, at one end of the side board, thence diagonally across and around the pulley D, centrally of the opposite side board, thence across to the pulley C, near the end of the opposite side board, thence around the pulleys E and E', near the ends of the head board, thence around the pulley $C^2$, near the end of the side board, thence diagonally across and around the pulley D, located centrally of the side board, thence around the pulley $C^2$ and around the pulley G', where it is connected with the eye or hook in the opposite rod I. From this it will be seen that the bedstead frame is braced both in a longitudinal and transverse direction and also that the corners are braced firmly or drawn toward each other.

In taking up any slack in the cord or wire rope or to draw the parts more firmly together by turning the swivel or yoke the rods are drawn inward, drawing on the cord or wire rope from both directions.

To prevent the wire cord from twisting in drawing the same the rods are made with flat engaging faces or in rectangular form in cross section to snugly fit the squared openings $h'$, in the head of the standards H, by which it will be seen that the cords or wire will be drawn in a direct line, and prevented from twisting or turning.

Having now described my invention, what I claim as new, and desire to secure by Letters Patent, is—

In a brace for bedsteads, pulleys connected to the head and foot boards and to the side rails at points adjacent to the abutting ends thereof pulleys located centrally of the side rails, a single cord or wire, and a tension device located between one pair of the end pulleys, and consisting of standards connected to the bed frame and provided with square or angular openings therein, guide rods mounted in and fitting the openings in said standards each having at one end means for connecting it to one end of the cord or wire and at the other provided with screw threads, and a swivel or yoke connected to the threaded ends of the rods, substantially as and for the purpose set forth.

In testimony whereof I have hereunto set my hand this 10th day of April, A. D. 1893.

CHARLES H. BERNHEIM.

Witnesses:
ALEX MAHON,
JOSÉ M. YZNAGA.